(12) United States Patent
Kim

(10) Patent No.: US 10,174,539 B2
(45) Date of Patent: Jan. 8, 2019

(54) AUTOMATIC GATE LIFTER FOR VEHICLE

(71) Applicants: Hyundai Motor Company, Seoul (KR); Kia Motors Corporation, Seoul (KR)

(72) Inventor: Duck Young Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/671,547

(22) Filed: Aug. 8, 2017

(65) Prior Publication Data

US 2018/0171698 A1 Jun. 21, 2018

(30) Foreign Application Priority Data

Dec. 16, 2016 (KR) .......................... 10-2016-0172996

(51) Int. Cl.
| | |
|---|---|
| *B62D 25/00* | (2006.01) |
| *E05F 15/611* | (2015.01) |
| *E05D 3/02* | (2006.01) |
| *B60J 5/10* | (2006.01) |
| *E05D 5/02* | (2006.01) |

(52) U.S. Cl.
CPC .............. *E05F 15/611* (2015.01); *E05D 3/02* (2013.01); *B60J 5/101* (2013.01); *E05D 5/0207* (2013.01); *E05Y 2201/434* (2013.01); *E05Y 2201/682* (2013.01); *E05Y 2900/546* (2013.01)

(58) Field of Classification Search
CPC ........ E05F 15/611; E05D 3/02; E05D 5/0207; E05D 5/062; E05D 5/043; E05Y 2900/546; E05Y 2201/682; E05Y 2201/434; B60J 5/101

USPC ........................................................... 296/56
See application file for complete search history.

(56) References Cited

U.S. PATENT DOCUMENTS

| | | | | |
|---|---|---|---|---|
| D317,769 | S  * | 6/1991 | Vining, Sr. .................... D15/1 |
| 5,911,437 | A  * | 6/1999 | Lawrence ................. B60S 9/10 |
| | | | | 254/419 |
| 6,055,775 | A  * | 5/2000 | Dering ................... E05F 1/1091 |
| | | | | 296/56 |
| 6,055,776 | A  * | 5/2000 | Dettling ................ E05F 15/619 |
| | | | | 296/56 |
| 6,283,535 | B1 * | 9/2001 | Yuge ....................... E05F 15/63 |
| | | | | 296/146.1 |
| 6,598,886 | B2 * | 7/2003 | Baird ....................... B60P 1/56 |
| | | | | 254/419 |
| 6,896,289 | B2 * | 5/2005 | Gross ....................... B60S 9/08 |
| | | | | 254/419 |
| 6,926,305 | B2 * | 8/2005 | Daniel ...................... B60S 9/08 |
| | | | | 254/419 |

(Continued)

FOREIGN PATENT DOCUMENTS

KR    10-2004-0040532 A    5/2004

*Primary Examiner* — Jerry E Redman
(74) *Attorney, Agent, or Firm* — Morgan, Lewis & Bockius LLP

(57) ABSTRACT

An automatic gate lifter for a vehicle may include a driving motor configured to provide rotational driving power, a hinge member constituting a hinge shaft such that a gate included in the vehicle is rotated about the hinge shaft, and an electronic clutch selectively connecting the hinge member and the driving motor such that the rotational driving power of the driving motor is selectively transmitted to the hinge member.

14 Claims, 7 Drawing Sheets

(56) References Cited

U.S. PATENT DOCUMENTS

| | | | |
|---|---|---|---|
| 6,993,949 B2* | 2/2006 | Dole | B21D 17/04 72/105 |
| 7,248,011 B2 | 7/2007 | Schachtl et al. | |
| 7,398,959 B2* | 7/2008 | VanDenberg | B60S 9/08 254/2 R |
| 7,806,647 B2* | 10/2010 | Gomes | B60P 1/4471 414/545 |
| 7,810,604 B2* | 10/2010 | Byers | A63H 17/262 180/385 |
| 8,590,417 B1* | 11/2013 | Bono | G05G 1/085 254/419 |
| 8,596,424 B2* | 12/2013 | Rauscher | E05C 17/203 188/156 |
| 8,894,039 B2* | 11/2014 | Conaway | B60S 9/08 254/419 |
| 9,114,965 B2* | 8/2015 | Reynolds | B66F 13/00 |
| 9,242,622 B1* | 1/2016 | Sanders | B60S 9/08 |
| 9,476,243 B2* | 10/2016 | Wuerstlein | E05F 15/46 |
| 9,630,597 B1* | 4/2017 | Magyar | B60S 9/08 |
| 9,873,410 B2* | 1/2018 | Laarman | B60S 9/08 |
| 2001/0033086 A1* | 10/2001 | Yuge | B60J 5/106 296/56 |
| 2005/0192677 A1* | 9/2005 | Ragnarsdottir | A61F 2/66 623/24 |
| 2009/0255185 A1* | 10/2009 | Schachtl | E05D 5/062 49/334 |
| 2011/0061200 A1* | 3/2011 | Rauscher | E05C 17/203 16/337 |
| 2012/0000304 A1* | 1/2012 | Hamminga | E05F 15/622 74/89.23 |
| 2012/0187710 A1* | 7/2012 | Oberle | F16H 37/041 296/57.1 |
| 2013/0169087 A1* | 7/2013 | Kummer | E05F 5/00 310/76 |
| 2014/0175828 A1 | 6/2014 | Lechkun et al. | |
| 2015/0105207 A1* | 4/2015 | Hagedorn | F16H 1/28 475/149 |
| 2015/0351979 A1* | 12/2015 | Conte | A61G 5/047 180/13 |
| 2016/0001826 A1* | 1/2016 | Kieninger | B62D 33/0273 475/331 |
| 2016/0059907 A1* | 3/2016 | Braun | H02K 15/00 310/75 R |
| 2017/0122018 A1* | 5/2017 | Huang | E05D 3/02 |
| 2018/0044965 A1* | 2/2018 | Takizawa | E05F 15/622 |

* cited by examiner

AUTOMATIC GATE LIFTER FOR VEHICLE

CROSS-REFERENCE TO RELATED APPLICATION

The present application claims priority to Korean Patent Application No. 10-2016-0172996, filed on Dec. 16, 2016, the entire contents of which is incorporated herein for all purposes by this reference.

BACKGROUND OF THE INVENTION

Field of the Invention

The present invention relates to an automatic gate lifter for a vehicle.

Description of—Related Art

In general, a tail gate installed at a rear side of a vehicle to be opened and closed, and a gate lifter for assisting an opening/closing operation of the tail gate are installed in a van or an RV vehicle.

The conventional gate lifter for a vehicle includes a spindle type driver, one end of which is coupled to a vehicle body and an opposite end of which is coupled to the tail gate. The spindle type driver includes a motor, a planetary gear configured to increase rotational power of the motor, a spindle shaft-rotated by the increased rotational power, a nut moved along the spindle when the spindle is rotated, and a spring configured to support a load of the tail gate with an elastic force. The spindle type drivers are installed at opposite ends of the vehicle body, respectively.

The conventional gate lifter for a vehicle has the following disadvantages.

First, in the conventional gate lifter for a vehicle, an opening width of the tail gate is relatively small as the spindle is applied.

Second, the conventional gate lifter for a vehicle has loss of power (a slip, a friction, or a moment) due to a link member for installing the spindle.

Third, the conventional gate lifter for a vehicle generates much noise and has a heavy weight because the pair of spindle type drives, to which power may be individually supplied, are provided.

Fourth, because the spindle type drives are installed in the conventional gate lifter for a vehicle to be exposed to the outside, the driver may be damaged by the spindle type drivers or the spindle type drivers may be broken.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an automatic gate lifter for a vehicle, of which a structure is improved such that a spindle and a link member may be omitted.

Various aspects of the present invention are directed to providing an automatic gate lifter for a vehicle, of which a structure is improved such that a tail gate may be opened or closed by use of a single power source.

Various aspects of the present invention are directed to providing an automatic gate lifter for a vehicle, of which a structure is improved such that the automatic gate lifter is not exposed to the outside of the vehicle.

The technical problems to be solved by the present invention are not limited to the aforementioned problems, and any other technical problems not mentioned herein will be clearly understood from the following description by those skilled in the art to which the present invention pertains.

According to various aspects of the present invention, an automatic gate lifter for a vehicle may include a driving motor configured to provide rotational driving power, a hinge member constituting a hinge shaft such that a gate included in the vehicle is rotated about the hinge shaft, and an electronic clutch selectively connecting the hinge member and the driving motor such that the rotational driving power of the driving motor is selectively transmitted to the hinge member.

The automatic gate lifter may further include an adapter shaft-coupled to the hinge member to be removable from the hinge member, and the electronic clutch may connect or disconnect the driving motor and the adapter.

The adapter may include an output pin that is parallel to an axial direction of the hinge shaft, and the hinge member may include an input hole formed such that the output pin is inserted into the input hole to be removable from the input hole.

The adapter may further include at least one coupling groove formed on an external peripheral surface of the output pin along the axial direction of the hinge shaft, and the hinge member may further include at least one coupling groove formed on an internal peripheral surface of the input hole such that a coupling boss is inserted into the coupling groove.

The adapter further include a connection head formed at one end portion thereof, and a connection pin connecting the connection head and the output pin, and the electronic clutch may include a drive bearing mounted on the connection pin to rotatably support the connection pin, and an electromagnet shaft-coupled to the driving motor and moved towards the drive bearing to be selectively connectable to the connection head when being magnetized by a current.

The automatic gate lifter may further include a reducer interposed between the driving motor and the electromagnet to reduce the rotational driving power of the driving motor at a specific reduction ratio and output the reduced rotational driving power, and the electromagnet may shaft-coupled to the reducer.

The reducer may include an output groove formed along the axial direction of the hinge shaft to reduce the rotational driving power at the specific reduction ratio and output the reduced rotational driving power, and the electromagnet may include an input pin shaft-coupled to the output groove to be movable along the axial direction of the hinge shaft.

The automatic gate lifter may further include an elastic member disposed between the connection head and the electromagnet to frictionally connect the connection head and the electromagnet when the electromagnet is magnetized and to form a specific gap between the connection head and the electromagnet when the electromagnet is non-magnetized.

The elastic member may be a washer spring having a wave shape.

The automatic gate lifter may further include a hinge bracket fixed to a specific location of the vehicle to rotatably support the hinge member.

The automatic gate lifter further include a housing including a fixing ring configured to fix the drive bearing, and a stopper ring provided between the electromagnet and the driving motor to interrupt movement of the electromagnet, and the connection head and the electromagnet may be disposed in the internal of the housing to be located between the fixing ring and the stopper ring.

The driver bearing may include a fixing groove formed along a circumference thereof such that the fixing ring is inserted into the fixing groove.

The housing may further include at least one fixing rib coupled to the hinge bracket.

Any one of the hinge bracket and the fixing rib may include a fixing hole, and the other of the hinge bracket and the fixing rib may include a fixing boss inserted into the fixing hole.

The automatic gate lifter may further include a hinge arm coupling the hinge member and the gate.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
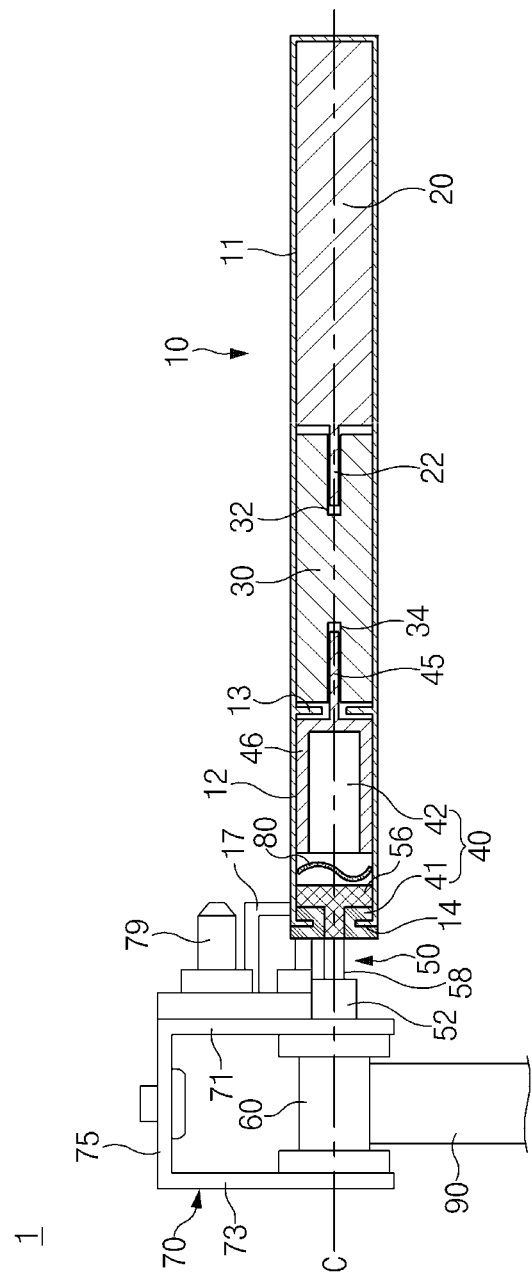
FIG. 1 is a partial longitudinal sectional view of an automatic gate lifter for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the drawings, the sizes of the components or specific portions of the components are exaggerated, omitted, or schematically illustrated for convenience and clarity of description. Accordingly, the sizes of the components totally reflect the actual sizes thereof. When the description of the known functions or configurations may make the essence of the present invention obscure, it will be omitted.

Figure 2:
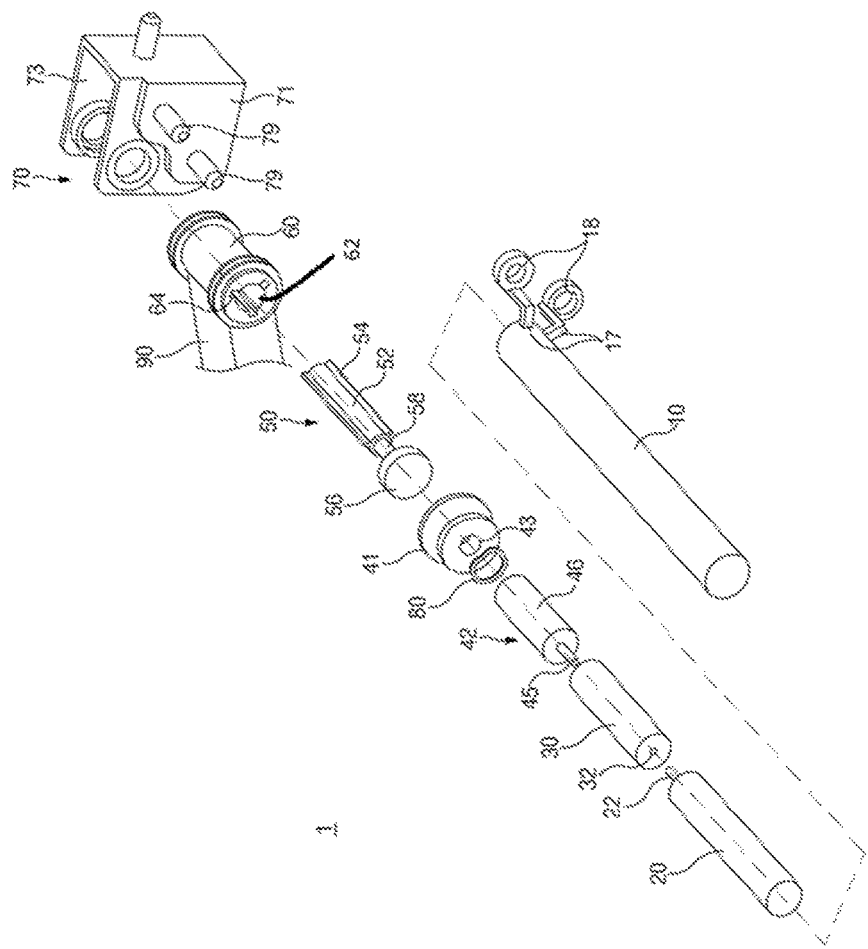
FIG. 2 is an exploded perspective view of the automatic gate lifter of FIG. 1.

FIG. 1 is a longitudinal sectional view of an automatic gate lifter for a vehicle according to an exemplary embodiment of the present invention. FIG. 2 is an exploded perspective view of the automatic gate lifter of FIG. 1.

Referring to FIGS. 1 and 2, the automatic gate lifter (hereinafter, referred to as 'an automatic gate lifter 1') for a vehicle according to an exemplary embodiment of the present invention may include a housing 10, a driving motor 20, a reducer 30, an electronic clutch 40, an adapter 50, a hinge member 60, and a hinge bracket 70. As illustrated in FIG. 1, the automatic gate lifter 1 may be provided such that a tail gate T of the vehicle may be rotated about a hinge shaft C formed by the hinge member 60.

First, the housing 10 is provided to accommodate the driving motor 20 and power transmission members for transmitting rotational driving power of the driving motor 20 to the tail gate T. As illustrated in FIG. 1, the housing 10 may include a first accommodation space 11, a second accommodation space 12, a stopper ring 13, and a fixing ring 14.

As illustrated in FIG. 1, the first accommodation space 11 provides an accommodation space for the driving motor 20 and the reducer 30. The first accommodation space 11 has a size corresponding to the driving motor 20 and the reducer 30 to prevent the driving motor 20 and the reducer 30 from being moved in the accommodation space 11. One end portion of the first accommodation space 11 is closed, and an opposite end portion of the first accommodation space 11 is partially opened by the stopper ring 13.

As illustrated in FIG. 1, the second accommodation space 12 provides an accommodation space for an electromagnet 42 of an electronic clutch 40, which will be described below, and a connection head 56 of an adapter 50, which will be described below. The second accommodation space 12 has a length that is longer than a total length of the connection head 56 and the electromagnet 42 by a specific length such that the electromagnet 42 may be reciprocally moved in the second accommodation space 12. One end portion of the second accommodation space 12 is partially opened by the stopper ring 13, and an opposite end portion of the second accommodation space 12 is partially opened by the fixing ring 14.

As illustrated in FIG. 1, the stopper ring 13 is provided at a boundary point of the opposite end portion of the first accommodation space 11 and the one end portion of the second accommodation space 12. The stopper ring 13 includes a hollow 15 having a diameter that is small as compared with the electromagnet 42 of the electronic clutch 40, which will be described below and is large as compared with an input pin 45 of the electromagnet 42, which will be described below. The hollow 15 partially opens a space between the first accommodation space 11 and the second accommodation space 12 such that only the input pin 45 of the electromagnet 42, which will be described below, may pass through the hollow 15 and the electromagnet 42 itself cannot pass through the hollow 15. Accordingly, the stopper ring 13 may interrupt movement of the electromagnet 42 such that the electromagnet 42 may be prevented from entering the second accommodation space 12 and moving towards the driving motor 20.

As illustrated in FIG. 1, the fixing ring 14 is provided at the opposite end portion of the second accommodation space 12. The fixing ring 14 includes a hollow 16 having a diameter corresponding to a fixing groove 44 of a drive bearing 41, which will be described below. The drive bearing 41 is fixed to the fixing ring 14. A coupling relationship of the fixing ring 14 and the drive bearing 41 will be described below in more detail.

Next, as illustrated in FIG. 1, the driving motor 20 is disposed in the first accommodation space 11. The driving motor 20 may include an output pin 22 formed along an axial direction (hereinafter, referred to as 'an axial direction) of the hinge shaft C to output rotational driving power for rotating the tail gate T.

Next, as illustrated in FIG. 1, the reducer 30 is disposed in the first accommodation space 11 to be located closer to the hinge member 60 than the driving motor 20. The reducer 30 may include an input groove 32 formed along the axial direction at one end portion thereof, and an output groove 34 formed along the axial direction at an opposite end portion thereof. The output pin 22 of the driving motor 20 is shaft-coupled to the input groove 32, and the input pin 45 of the electromagnet 42 is shaft-coupled to the output groove 34. The reducer 30 reduces the rotational driving power of the driving motor 20 received through the output pin 22 at a specific reduction ratio, and transmits the reduced rotational driving power to the electromagnet 42 through the output groove 34. The reducer 30 preferably includes a planetary, but the present invention is not limited thereto.

Figure 3:
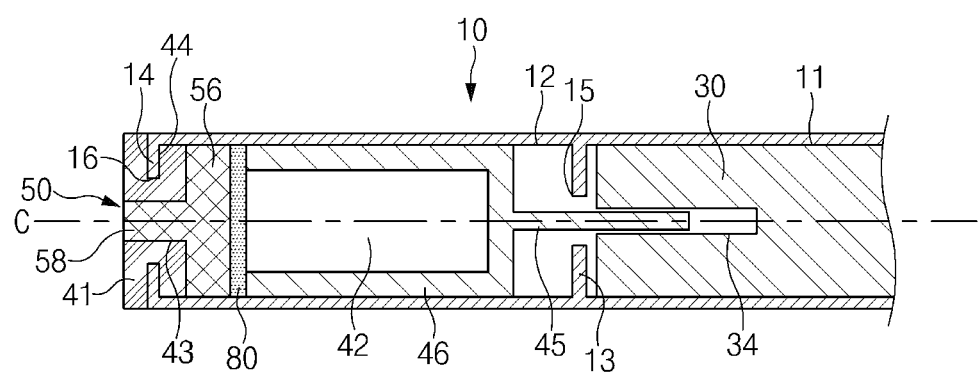
FIG. 3 is a view illustrating a state in which an electromagnet and a connection head of FIG. 1 are connected to each other.
Figure 4:
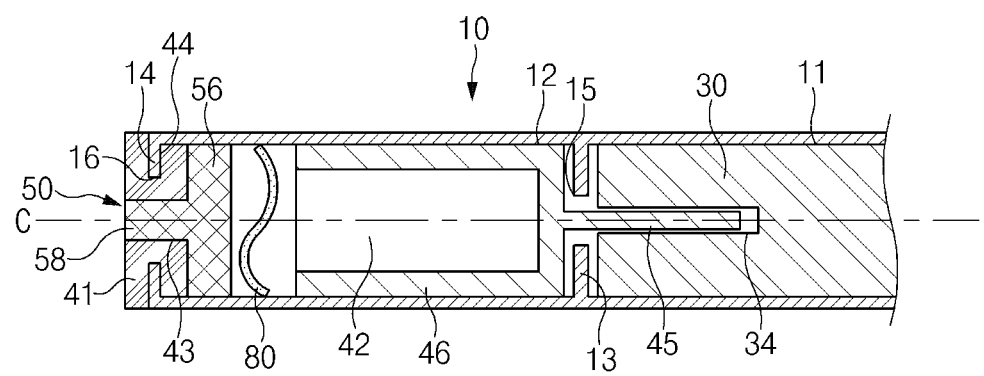
FIG. 4 is a view illustrating a state in which the electromagnet and the connection head of FIG. 1 are disconnected from each other.

FIG. 3 is a view illustrating a state in which the electromagnet and the connection head of FIG. 1 are disconnected from each other. FIG. 4 is a view illustrating a coupling relationship between a hinge member and a hinge bracket of FIG. 1.

Next, the electronic clutch 40 may selectively transmit the rotational driving power of the driving motor 20 transmitted via the reducer 30 to the adapter 50. As illustrated in FIG. 1, the electronic clutch 40 may include a drive bearing 41 and an electromagnet 42.

As illustrated in FIG. 1 and FIG. 2, the drive bearing 41 includes a hollow 43, into which a connection pin 58 of the adapter 50, which will be described below, is inserted, and a fixing groove 44 formed along a circumference thereof such that the fixing ring 14 of the housing 10 may be inserted into the fixing groove 44. The drive bearing 41 is a radial bearing that may rotatably support the connection pin 58 inserted into the hollow 43.

At least one portion of the drive bearing 41 is formed of a magnetic material such that an attractive force or a repulsive force may be applied between the drive bearing 41 and the electromagnet 42 when the electromagnet 42, which will be described below, is magnetized. For example, at least one portion of the drive bearing 41 may include a permanent magnet.

As illustrated in FIG. 1, the drive bearing 41 is mounted on the connection pin 58 such that the connection pin 58 is inserted into the hollow 43, and is fixed to the housing 10 such that the fixing ring 14 is inserted into the fixing groove 44 as well.

As illustrated in FIG. 1, the electromagnet 42 is accommodated in the second accommodation space 12 to be located between the connection head 56 of the adapter 50, which will be described below, and the stopper ring 13. The electromagnet 42 may be reciprocally moved along the axial direction thereof. The electromagnet 42 may be magnetized by a current applied from the outside, and a polarity of the electromagnet 42 changes according to the direction of the current. Accordingly, as illustrated in FIG. 3, when the electromagnet 42 is magnetized to have an opposite polarity to that of the drive bearing 41, it may move towards the drive bearing 41 by an attractive force applied between the drive bearing 41 and the electromagnet 42. Accordingly, as illustrated in FIG. 4, when the electromagnet 42 is magnetized to have the same polarity as that of the drive bearing 41, it may move towards the reducer 30 by a repulsive force applied between the drive bearing 30 and the electromagnet 42.

The electromagnet 42 includes an input pin 45 formed at one end portion thereof to be parallel to the axial direction thereof. As illustrated in FIG. 1, the input pin 45 may be shaft-coupled to the output groove 34 of the reducer 30 to be moved along the axial direction thereof. Accordingly, the electromagnet 42 may receive the rotational driving power of the driving motor 20 output from the output groove 34 of the reducer 30 through the input pin 45. Meanwhile, as illustrated in FIG. 3, the electromagnet 42 may be disposed in the internal of an electromagnet case 46, and the input pin 45 may be provided in the electromagnet case.

As illustrated in FIG. 3 and FIG. 4, as the electromagnet 42 may be reciprocally moved in the second accommodation space 12 to be connected to or disconnected from the connection head 56 of the adapter 50, the rotational driving power of the driving motor 20 may be selectively transmitted to the adapter 50. A connection of the electromagnet 42 and the adapter 50 will be described below in more detail.

Next, the adapter 50 is shaft-coupled to the hinge member 60 to be removable from the hinge member 60 to transmit the rotational driving power of the driving motor 20 transmitted via the electromagnet 42 to the hinge member 60. The adapter 50 is formed of a non-magnetic material such that an attractive force or a repulsive force is not applied between the electromagnet 42 and the adapter 50. As illustrated in FIG. 2, the adapter 50 may include an output pin 52, a coupling boss 54, a connection head 56, and a connection pin 58.

The output pin 52 is parallel to the axial direction, and is inserted into the input hole 62 of the hinge member 60, which will be described below, to be removable from the input hole 62 of the hinge member 60. When the connection head 56 and the electromagnet 42 are connected to each other, the output pin 52 may transmit the rotational driving power of the driving motor 20 transmitted via the electromagnet 42 to the hinge member 60.

The coupling boss 54 is formed on an external peripheral surface of the output pin 52 along the axial direction, and is inserted into the coupling groove 64 of the hinge member 60, which will be described below. As illustrated in FIG. 2, a plurality of coupling bosses 54 are preferably formed at a specific angular interval, but the present invention is not limited thereto. The coupling boss 54 may reinforce a coupling force of the output pin 52 to the input hole 62 such that a slip does not occur between the output pin 52 and the input hole 62.

The connection head 56 is formed at one end portion of the adapter 50 towards the driving motor 20, and is accommodated in the second accommodation space 12 to face the electromagnet 42. As illustrated in FIG. 1, an elastic member 80 for frictionally connecting the connection head 56 and the electromagnet 42 or forming a gap between the connection head 56 and the electromagnet 42 may be disposed between the connection head 56 and the electromagnet 42. As illustrated in FIG. 2, the elastic member 80 is preferably a washer spring having a wave shape, but the present invention is not limited thereto.

The connection pin 58 connects the connection head 56 and the output pin 52, and is inserted into the hollow 43 of the drive bearing 41 to be rotatably supported by the drive bearing 41. As illustrated in FIG. 2, the connection pin 58 preferably has a diameter that is smaller than those of the connection head 56 and the output pin 52, but the present invention is not limited thereto.

Hereinafter, a method of connecting the electromagnet 42 and the connection head 56 will be described with reference to FIG. 3.

First, a current is applied to the electromagnet 42 such that the electromagnet 42 is magnetized to an opposite polarity to that of the drive bearing 41. As such, as illustrated in FIG. 3, the electromagnet 42 moves towards the drive bearing 41 by an attractive force applied between the drive bearing 41 and the electromagnet 42 to press the elastic member 80. As the elastic member 80 is elastically deformed to be adhered to the connection head 56 and the electromagnet 42 by the electromagnet 42, it frictionally connects the electromagnet 42 and the connection head 56. That is, the electromagnet 42 and the connection head 56 are connected to each other by a frictional force applied between the electromagnet 42 and the resilient member 80 and a frictional force applied between the connection head 56 and the elastic member 80. Through this, the connection head 56 may receive the rotational driving power of the driving motor 20 via the electromagnet 42.

Hereinafter, a method of disconnecting the electromagnet 42 and the connection head 56 will be described with reference to FIG. 4.

First, an attractive force between the electromagnet 42 and the drive bearing 41 is removed by interrupting the current applied to the electromagnet 42 to non-magnetize the electromagnet 42. As such, as the elastic member 80 is elastically restored to have a wave shape to form a gap between the electromagnet 42 and the connection head 56, the electromagnet 42 and the connection head 56 may be disconnected from each other.

Figure 5:
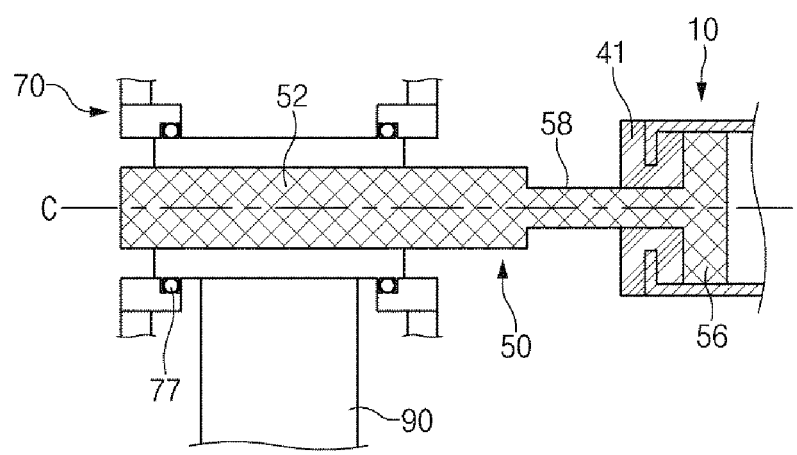
FIG. 5 is a view illustrating a coupling relationship between a hinge member and a hinge bracket of FIG. 1.

FIG. 5 is a view illustrating a coupling relationship between a hinge member and a hinge bracket of FIG. 1.

Next, the hinge member 60 forms a hinge shaft C of the tail gate T for rotating the tail gate T by use of the rotational driving power of the driving motor 20. As illustrated in FIG. 2, the hinge member 60 has a cylindrical shape and is connected to the tail gate T by a hinge arm 90.

As illustrated in FIG. 5, the hinge member 60 is mounted to the hinge bracket 70 such that opposite end portions thereof are rotatably supported by hinge bearings 77 of the hinge bracket 70, which will be described below. As illustrated in FIG. 2, the hinge member 60 may include an input hole 62 and a coupling groove 64.

The input hole 62 is formed along the axial direction such that the output pin 52 of the adapter 50 may be inserted into the input hole 62 to be removable from the input hole 62. The coupling groove 64 is formed on an internal peripheral surface of the input hole 62 along the axial direction such that the coupling boss 54 of the adapter 50 may be inserted into the coupling groove 64. The number of coupling grooves 64 is not limited, and the coupling grooves 64 corresponding to the number of the coupling bosses 54 may be formed at the same interval as that of the coupling bosses 54. The output pin 52 of the adapter 50 and the coupling boss 54 are inserted to the input hole 62 and the coupling groove 64, respectively, and accordingly, the hinge member 60 is connected to the adapter 50. As such, when the electromagnet 42 and the connection head 56 are connected to each other, the hinge member 60 may automatically open or close the tail gate T by rotating the tail gate T by use of the rotational driving power of the driving motor 20. Accordingly, the hinge member 60 may function as a power transmission member for transmitting the rotational driving power of the driving motor 20 to the tail gate T and a shaft member forming the hinge shaft C of the tail gate T as well.

Meanwhile, when the driver manually opens or closes the tail gate T while the electromagnet 42 and the connection head 56 are connected to each other, the power transmission members and the driving motor 20 are manually rotated by the rotational driving power (hereinafter, referred to as "manual operation power") applied by the driver. As such, as the power transmission members and the driving motor 20 act as rotational loads, manual operation power that is necessary for manually opening or closing the tail gate T increases and a counter electromotive force occurs in the driving motor 20. A control device including an ECU of the vehicle may detect whether the tail gate T is being manually opened or closed by measuring a current generated by the counter electromotive force. When the current due to the counter electromotive force reaches a specific reference value, the control device non-magnetizes the electromagnet 42 or magnetizes the electromagnet 42 such that a repulsive force is applied between the electromagnet 42 and the drive bearing 41. As such, as the electromagnet 42 and the connection head 56 are distanced from each other to be disconnected from each other, the manual operation power that is necessary when the tail gate T is manually opened or closed may be reduced.

Figure 6:
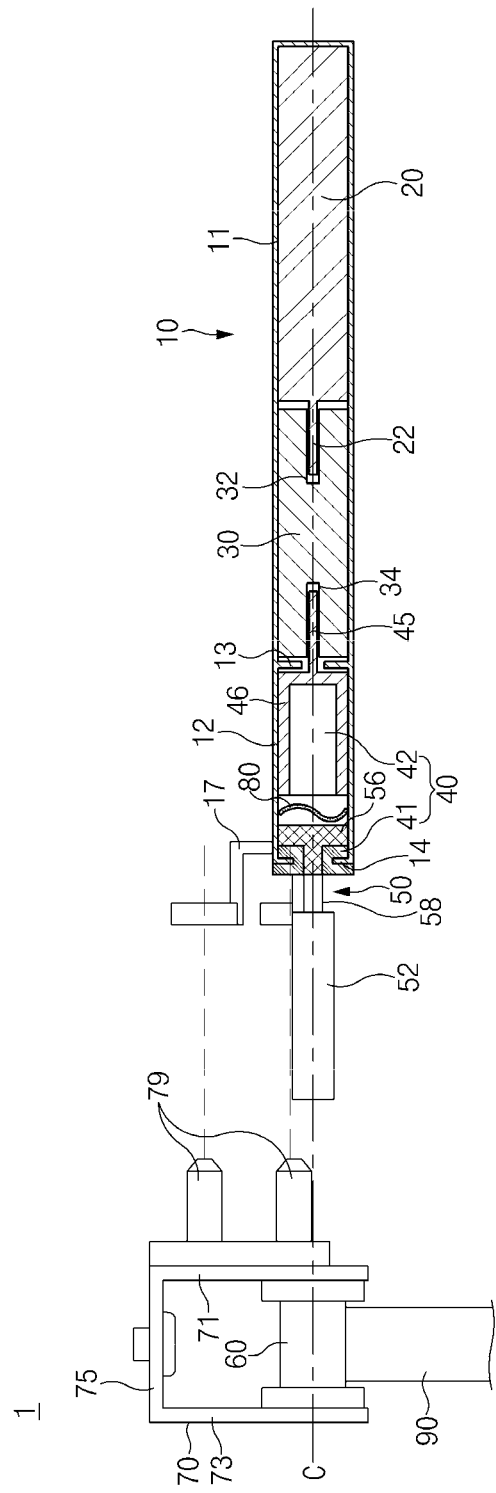
FIG. 6 is a view illustrating a coupling relationship between the hinge bracket and a housing of FIG. 1.

FIG. 6 is a view illustrating a coupling relationship between the hinge bracket and a housing of FIG. 1.

Next, the hinge bracket 70 rotatably supports the hinge member 60 and fixes the housing 10 at a specific location. As illustrated in FIG. 2, the hinge bracket 70 includes a pair of side plates 71 and 73 facing each other, and a connection plate 75 connecting the side plates 71 and 73.

As illustrated in FIG. 2, each of the side plates 71 and 73 may include a hinge bearing 77 that may rotatably support any one of the opposite end portions of the hinge member 60. The connection plate 75 may be coupled to a specific location of the vehicle body B by a coupling member including a bolt, and may fix the hinge bracket 70 and the hinge member 60 to the vehicle body B.

Meanwhile, the housing 10 may be fixed to the hinge bracket 70. For example, as illustrated in FIG. 2, the housing 10 may further include a fixing rib 17 extending to face any one 71 of the side plates 71 and 73 to be fixed to the side plate 71. As illustrated in FIG. 2, a pair of fixing ribs 17 may be distanced from each other by a specific interval. Meanwhile, the present invention is not limited thereto, and at least one fixing rib 17 may be provided.

The method of fixing the fixing rib 17 to the hinge bracket 70 is not limited. For example, the fixing rib 17 may include a fixing hole 18 punched at one end portion thereof, and the side plate 71 may include a fixing boss 79 formed to be inserted into the fixing hole 18. The number of fixing bosses 79 is not limited, and the number of fixing bosses 79 may correspond to the number of fixing ribs 17. As illustrated in FIG. 6, due to the fixing bosses 79 and the fixing holes 18, the housing 10 is fixed to the hinge bracket 70 as the fixing bosses 79 are inserted into the fixing holes 18. Through this, the interval between the housing 10 and the hinge bracket 70 may be constantly maintained, and power may be prevented from being lost as the housing 10 is rotated by the rotational driving power of the driving motor 20.

Figure 7:
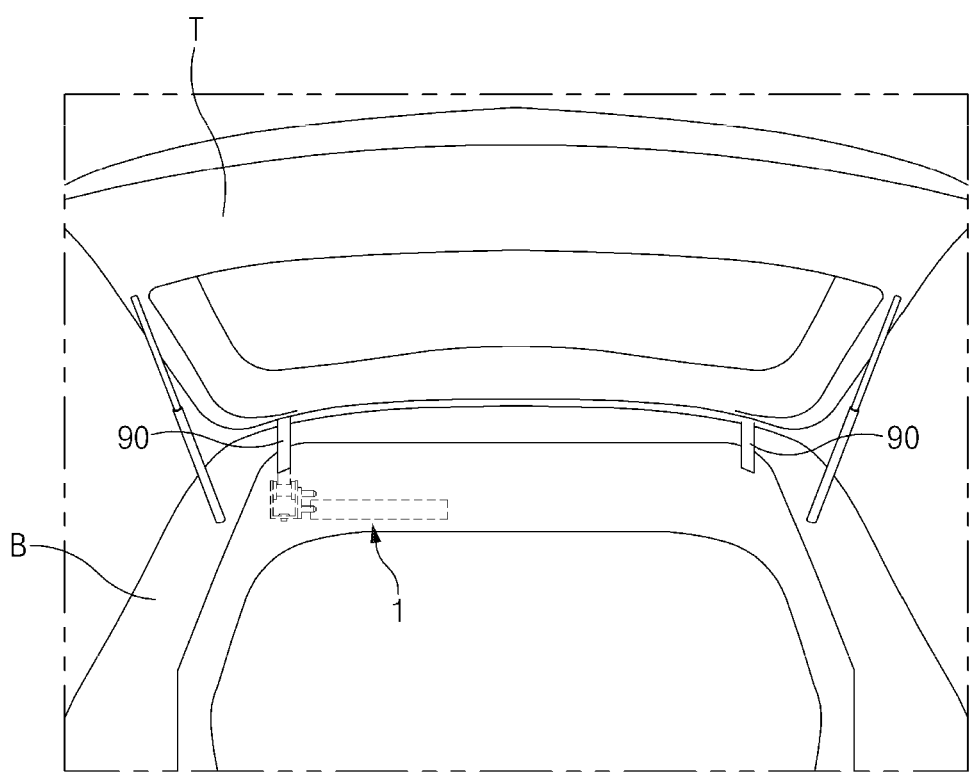
FIG. 7 is a perspective view illustrating a state in which the automatic gate lifter of FIG. 1 is disposed in a vehicle.

FIG. 7 is a perspective view illustrating a state in which the automatic gate lifter of FIG. 1 is disposed in a vehicle.

The automatic gate lifter 1 connects the driving motor 20 and the hinge member 60 without using a separate link member. Accordingly, the automatic gate lifter 1 may reduce loss of power due to a link member, and may reduce operation noise of the driving motor 20 by reducing an RPM of the driving motor 20.

Because the automatic gate lifter 1 has a structure for reducing loss of power, the tail gate T may be smoothly opened or closed even only by one automatic gate lifter 1. For example, as illustrated in FIG. 6, the automatic gate lifter 1 may be disposed at one end portion of the vehicle body B, only the hinge arm and the hinge member are provided at an opposite end portion of the vehicle body B, and a general hinge device without a driving motor and a power transmission member may be disposed. Accordingly, because the automatic gate lifter 1 may reduce the number of components for opening or closing the tail gate T, manufacturing costs, the number of assembly processes, and the weight of the vehicle may be reduced.

The location of the automatic gate lifter 1 is not limited. For example, as illustrated in FIG. 6, the automatic gate lifter 1 may be buried parallel to the vehicle body B such that only the hinge arm 90 is limitedly exposed to the outside of the vehicle. Accordingly, the automatic gate lifter 1 may prevent the driver from being injured by the driving motor 20 and the power transmission members and prevent the driving motor 20 and the power transmission members from being damaged.

The automatic gate lifter for a vehicle according to an exemplary embodiment of the present invention has the following effects.

First, according to an exemplary embodiment of the present invention, because the driving motor and the hinge member may be connected without using a separate link member, loss of power due to the link member may be reduced, and operation noise of the driving motor may be reduced by reducing an RPM of the driving motor.

Second, according to an exemplary embodiment of the present invention, because the tail gate may be smoothly opened or closed even only by one automatic gate lifter, the number of components for opening or closing the tail gate may be reduced so that manufacturing costs, the number of assembling processes, and the weight of the vehicle may be reduced.

Third, according to an exemplary embodiment of the present invention, because the driving motor and the power transmission members are buried in the vehicle body, the driver may be prevented from being injured by the driving motor and the power transmission members or the driving motor and the power transmission members may be prevented from being damaged.

Fourth, according to an exemplary embodiment of the present invention, because the hinge and the driving device are integrally formed, weight and manufacturing costs may be reduced as compared with the conventional gate lifter that requires a separate configuration for fixing a driving device individually disposed from the hinge.

Fifth, according to an exemplary embodiment of the present invention, because the driving device may be detachably mounted on the hinge, an automatic opening or closing function of the tail gate using the automatic gate lifter may be easily added or removed.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic gate lifter for a vehicle comprising:
   a driving actuator configured to provide a rotational driving power;
   a hinge member constituting a hinge shaft, wherein a gate included in the vehicle is rotated about the hinge shaft;
   an electronic clutch selectively connecting the hinge member and the driving actuator, wherein the rotational driving power of the driving actuator is selectively transmitted to the hinge member; and
   an adapter shaft-coupled to the hinge member, wherein the electronic clutch selectively connects the driving actuator and the adapter,
   wherein one of the adapter and the hinge member includes a pin that is in parallel to an axial direction of the hinge shaft and the other of the adapter and the hinge member includes a hole, and wherein the pin is inserted into the hole to be removable from the hole.

2. The automatic gate lifter of claim 1,
   wherein the adapter comprises the pin including to an output pin that is in parallel to an axial direction of the hinge shaft,
   wherein the hinge member comprises the hole including an input hole, and
   wherein the output pin is inserted into the input hole to be removable from the input hole.

3. The automatic gate lifter of claim 2, wherein the adapter further includes:
   at least one coupling groove formed on an external peripheral surface of the output pin along the axial direction of the hinge shaft, and
   wherein the hinge member further includes:
   at least one coupling groove formed on an internal peripheral surface of the input hole, wherein a coupling boss is inserted into the coupling groove.

4. The automatic gate lifter of claim 2, wherein the adapter further includes:
   a connection head formed at one end portion thereof, and
   a connection pin connecting the connection head and the output pin, and
   wherein the electronic clutch includes:
   a drive bearing mounted on the connection pin to rotatably support the connection pin; and an electromagnet shaft-coupled to the driving actuator and moved towards the drive bearing to be selectively connectable to the connection head when being magnetized by a current.

5. The automatic gate lifter of claim 4, further including:
a reducer interposed between the driving actuator and the electromagnet to reduce the rotational driving power of the driving actuator at a predetermined reduction ratio and output the reduced rotational driving power,
wherein the electromagnet is shaft-coupled to the reducer.

6. The automatic gate lifter of claim 5, wherein the reducer includes:
an output groove formed along the axial direction of the hinge shaft to reduce the rotational driving power at the predetermined reduction ratio and output the reduced rotational driving power, and
wherein the electromagnet includes:
an input pin shaft-coupled to the output groove to be movable along the axial direction of the hinge shaft.

7. The automatic gate lifter of claim 4, further including:
an elastic member disposed between the connection head and the electromagnet to frictionally connect the connection head and the electromagnet when the electromagnet is magnetized and to form a predetermined gap between the connection head and the electromagnet when the electromagnet is non-magnetized.

8. The automatic gate lifter of claim 7, wherein the elastic member is a washer spring having a wave shape.

9. The automatic gate lifter of claim 4, further including:
a hinge bracket fixed to a predetermined location of the vehicle to rotatably support the hinge member.

10. The automatic gate lifter of claim 9, further including:
a housing including a fixing ring configured to fix the drive bearing, and a stopper ring mounted between the electromagnet and the driving actuator to interrupt movement of the electromagnet,
wherein the connection head and the electromagnet are disposed in an internal of the housing to be located between the fixing ring and the stopper ring.

11. The automatic gate lifter of claim 10, wherein the driver bearing includes:
a fixing groove formed along a circumference thereof, wherein the fixing ring is inserted into the fixing groove.

12. The automatic gate lifter of claim 10, wherein the housing further includes:
at least one fixing rib coupled to the hinge bracket.

13. The automatic gate lifter of claim 12, wherein one of the hinge bracket and the fixing rib includes a fixing hole, and
wherein the other of the hinge bracket and the fixing rib includes a fixing boss inserted into the fixing hole.

14. The automatic gate lifter of claim 1, further including:
a hinge arm coupling the hinge member and the gate.

* * * * *